United States Patent [19]

Garwin et al.

[11] Patent Number: 4,620,253
[45] Date of Patent: Oct. 28, 1986

[54] LOW MASS ACTUATOR SYSTEM FOR MAGNETIC RECORDING DISK

[75] Inventors: Richard L. Garwin, Scarsdale; David A. Thompson, South Salem, both of N.Y.

[73] Assignee: International Business Machines Corporation, Armonk, N.Y.

[21] Appl. No.: 517,987

[22] Filed: Jul. 28, 1983

Related U.S. Application Data

[63] Continuation of Ser. No. 221,607, Dec. 31, 1980, abandoned.

[51] Int. Cl.[4] .................. G11B 5/55; G11B 21/08; G11B 5/52; G11B 21/04
[52] U.S. Cl. ......................... 360/107; 360/106; 360/77; 360/98; 318/135; 310/12; 310/13
[58] Field of Search .................. 310/12, 13, 14, 27; 318/135; 360/77, 78, 105, 106, 107, 98, 104, 105

[56] References Cited

U.S. PATENT DOCUMENTS

| | | | |
|---|---|---|---|
| 561,899 | 6/1896 | Leffler | 310/13 |
| 2,897,484 | 7/1959 | Vogel | 360/103 |
| 3,637,928 | 1/1972 | Poulett | 360/106 |
| 3,691,543 | 9/1972 | Mueller | 360/77 |
| 3,906,326 | 9/1975 | Chur | 360/106 |
| 4,019,205 | 4/1977 | Salmond et al. | 360/106 |
| 4,042,863 | 8/1977 | von der Heide | 318/254 |
| 4,151,447 | 4/1979 | von der Heide et al. | 310/12 |
| 4,163,265 | 7/1979 | van Herk et al. | 360/77 |
| 4,208,679 | 6/1980 | Hertrich | 360/77 |
| 4,217,612 | 8/1980 | Matla et al. | 360/77 |
| 4,296,443 | 10/1981 | Sakamoto et al. | 360/77 |
| 4,314,295 | 2/1982 | Frandsen | 360/106 |
| 4,318,038 | 3/1982 | Munehiro | 310/27 |
| 4,322,762 | 3/1982 | Manzke et al. | 360/106 |
| 4,396,966 | 8/1983 | Scranton et al. | 310/13 |
| 4,402,025 | 8/1983 | Anderson et al. | 360/98 |

FOREIGN PATENT DOCUMENTS

| | | | |
|---|---|---|---|
| 50-4384 | 7/1976 | Japan . | |
| 55-68869 | 5/1980 | Japan | 310/12 |
| 54-11221 | 8/1980 | Japan . | |
| 57-52365 | 3/1982 | Japan | 310/12 |
| 58-108063 | 6/1983 | Japan | 360/106 |

OTHER PUBLICATIONS

IBM Technical Disclosure Bulletin, vol. 21, No. 11, Apr. 1979, pp. 4632-4633 "Small Modular/Linear Voice Coil Actuator", by Johnson, Jr. et al.

*Primary Examiner*—John H. Wolff
*Assistant Examiner*—Alfonso Garcia
*Attorney, Agent, or Firm*—Graham S. Jones, II; Alexander Tognino

[57] ABSTRACT

An actuator for a magnetic read/write head carried by a linear motor has its stator located between a pair of disks within a stack of magnetic recording disks. The stator comprises an array of reversed polarity magnets (preferably permanent) in a linear array. A pair of flat coils are the drive elements of the armature of the motor with the coils arranged in side-by-side relationship for bridging from magnet to magnet in the stator. Thus the armature will not be stalled between magnets. The actuator is controlled by an electronic control system for selecting any position precisely, rather than in steps as in a stepping motor. A microprocessor can be used to adjust control of the direction of motion of the actuator based upon feedback signals.

3 Claims, 13 Drawing Figures

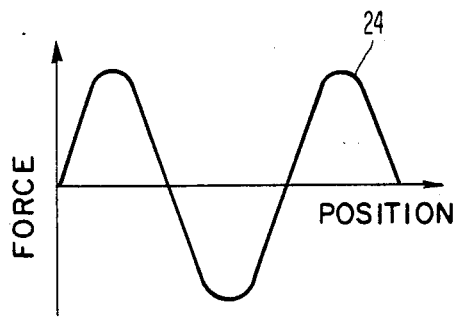
FIG. 6.1
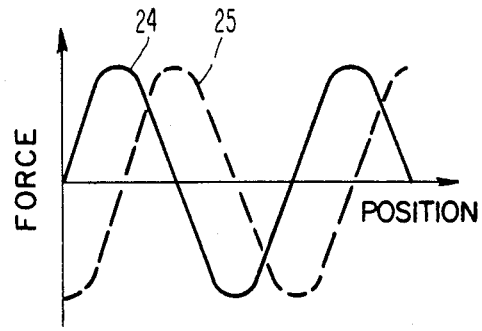
FIG. 6.2
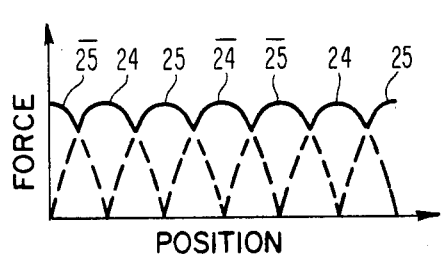
FIG. 6.3
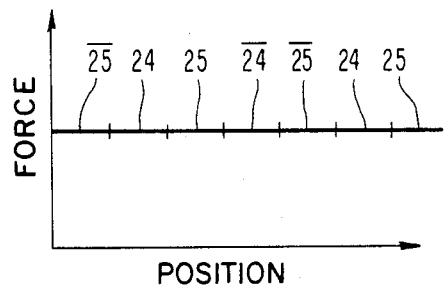
FIG. 6.4
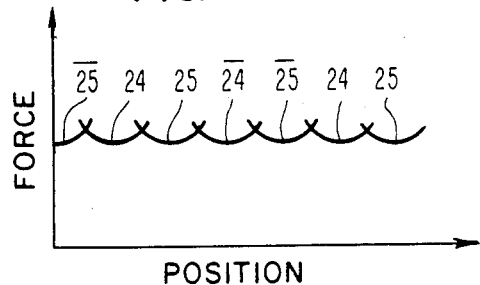
FIG. 6.5

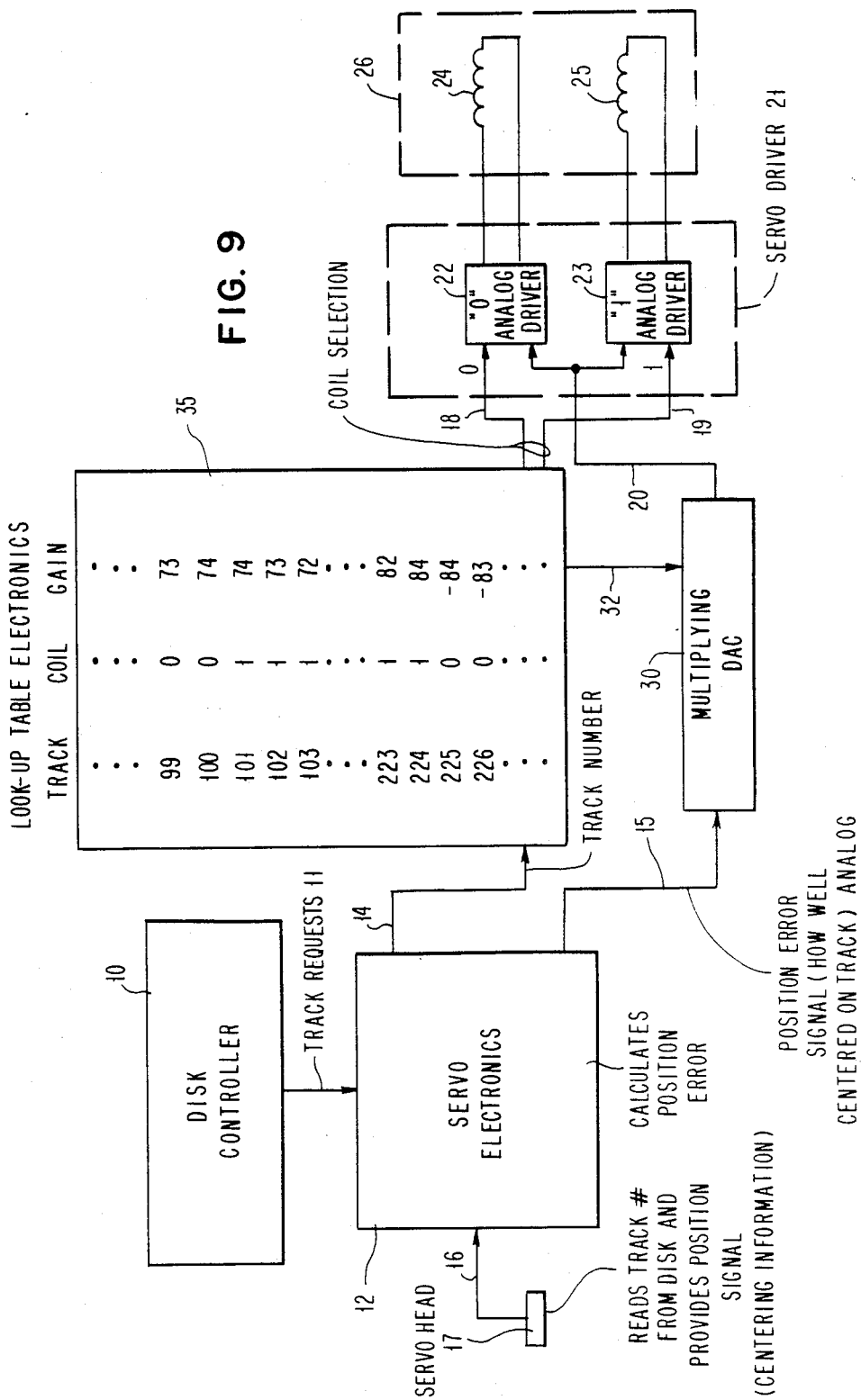

LOW MASS ACTUATOR SYSTEM FOR MAGNETIC RECORDING DISK

This is a continuation application of application Ser. No. 221,607, filed Dec. 31, 1980, now abandoned.

DESCRIPTION

1. Technical Field

This invention relates to magnetic recording disk systems and more particularly to read/write head actuator systems for such disk systems.

In reading and recording with magnetic recording disk stacks, the speed of seek operations in moving from one random position to another as required by the random requirements of a data processing system is important. Present linear voice coil actuators involve large moving masses. Such large mass actuators are slow. There is a need for a low mass accurate linear actuator having a stroke which traverses the entire recording width of a disk.

2. Background Art

U.S. Pat. No. 3,735,163 of Dijkstra et al entitled "Linear Motor for the Positioning of Magnetic Heads" shows a roller mounted bulky structure with a very large permanent magnet located to one side of the stack of disks. This arrangement has all of the mechanical problems to be overcome by this invention.

U.S. Pat. No. 4,030,132 of Iftikar et al for a "Dual Mode Velocity Servo Control for a Linear Actuator Motor" shows the conventional voice coil type of actuator for a disk file in its FIG. 1A. A servo control system for that arrangement is described.

In U.S. Pat. No. 3,899,699 of Griffing for a "Brushless Linear DC Motor Actuator", the stator includes a single very long permanent bar magnet with a north pole along one elongated side near the armature and a south pole along the outer side of the bar magnet. The motor is of an entirely different design from the instant invention.

An IBM Technical Disclosure Bulletin article of Lissner et al (I) dated March 1975, pp. 3016-8, entitled "Disk File Actuator," states upon page 3017, under item (c) that "A shielded magnetic core mounted to ground is cantilevered between the disks. The core has a slit gap 24 in which is suspended the flat rectangular coil 18. The magnetic structure is segmented into discrete magnets 26a,b with alternating polarity. In the gaps 22 of adjacent magnets lie the two driving legs of the rectangular coil 18."

A similar article by Lissner et al (II) is entitled "Disk File Actuator Design Permits Increased Track Density," Computer Design, February 1979, pp. 116-120.

The overall Lissner et al actuator is a piggyback design with a long stroke conventional voice coil actuator 10 (FIG. 1 of Lissner et al) and a rotary stage which uses a pair of magnets and a flat pivoted coil to provide a rotary motion. Disadvantages of the pivoted coil are that it produces an orientation problem and a center shift (cited on page 119 of Lissner et al (II)) and it has a very limited stroke for the flat coil stage.

The pivot arm 14 is a rotary motor driven by its flat coil and two permanent magnets, with which it cooperates to pivot the head 16 back and forth as shown in FIG. 1 of Lissner et al.

In summary the design of Lissner et al I and II is limited to motion between the two closely spaced magnets 26 a and b, so it has a short excursion unsuitable to reading/writing a large region on a disk. It is not a stepping motor and it utilizes and requires no feedback control in functioning as a motor.

R. K. Oswald, "Design of a Disk File Head Positioning Servo," IBM Journal of Research & Development November 1974, pp. 506-512, describes a conventional closed loop servo system using an actuator whose properties, e.g., gain, force constant, inertia etc., are nominally independent of position. That system is directed to use with a voice coil actuator. Santana U.S. Pat. No. 3,534,344 for "Method and Apparatus for Recording and Detecting Information" shows another voice coil actuator system.

DISCLOSURE OF INVENTION

A linear actuator for a magnetic recording disk file composed of disks includes a stator and a shuttling armature composed of a pair of flat coils supported on a thin, low mass carriage. The stator includes a number of permanent magnets of alternating magnetic polarity located in an array, side-by-side. The coils are energized to interact with the magnets to propel the armature linearly along the array of magnets. The coils are driven alternately by a control system which moves the head to satisfy a position control input signal with the cooperation of feedback of actual head position information from the disk media to a microprocessor which monitors the instantaneous track position and the requested track number. The coils are used alternately because if an energized coil is centered over a boundary between magnets, even at full current the actuator can be stalled. Thus, for example, if a first coil is at dead center, the second coil must be used to drive the unit off dead center. The microprocessor coordinates such changes. The overall system permits continuous servo control rather than linear stepper motor control. Thus, the head can be held at a desired position by producing currents in the coils in a continuously variable fashion to counter varying disturbances or to accommodate runout or wobble of the disk.

This actuator enables attainment of Direct Access Storage Device (DASD) files with independently controlled actuators per disk surface. Studies of DASD system performance suggests that such an approach can result in significantly shorter average response times (at the request rates necessary for DASD files to be used with future processors) than those achievable with extensions of present voice coil actuator concepts. An array of such linear actuators is also less expensive than the conventional approach.

This linear motor has advantages in performance (acceleration, size of actuator and hence availability of more heads) cost, and in the possibility of separately controlled heads for each disk surface, rather than ganging the heads for all surfaces on a single drive. The much smaller moving mass of this actuator has very substantial advantages in reducing the size of the massive frame now required, in allowing assembly by personnel who cannot lift heavy weights, and the like. It has advantages simultaneously in performance, cost, size, and weight.

BRIEF DESCRIPTION OF DRAWINGS

FIG. 6.1 shows the force versus position curve for coil 24 for a given current in the coil, with the force reversing as shown.

FIG. 6.2 shows the force versus position curve of FIG. 6.1 with the force versus position curve of coil 25 shown in dotted lines to show the offset of the two curves.

FIG. 6.3 shows the force versus position curve of the actuator coils with the combination indicating the result of switching the current on and off to the coils and reversing it under microprocessor control for provision of a relatively smooth integral force versus position curve.

FIG. 6.4 shows the force versus position curve provided after the gain to the actuator coils has been adjusted by the microprocessor to smooth out the curve electronically.

FIG. 6.5 shows the gain versus position curve for providing the correction of curves in FIG. 6.3 to produce the straight line of FIG. 6.4.

FIG. 9 shows the servo mechanism and data processing control circuits for the coils driving the armature.

FIG. 1 shows a conventional prior art, linear, voice coil actuator for moving the disk reading heads 3. The magnetic stator 6 provides a field which actuator solenoid 5 utilizes to move the head 3 linearly. Carriage 2 connects the heads 3 to the solenoid 5. Disks 1, 1' and 1" rotate about the spindle 4.

FIG. 2 illustrates a set of linear actuators in accordance with the current invention each with a stator 40 including magnetic yokes (not shown for convenience of illustration) and each with an array of alternating polarity magnetic poles 42 and 43 extending within a space between a pair of the disks 1, 1' and 1" and each with a very lightweight carriage 46 carrying a pair of heads 3. The distributed stator 40 and the lightweight shuttling carriages 46 of the armatures increase the speed and accuracy of positioning because of reduced mechanical stresses upon the system. Much of the reduction in moving are achieved by elimination of a comb-shaped support carriage member 2 between the force-producing coils 5 and the head 3 in FIG. 1.

An actuator is shown in greater detail in FIG. 3 with the stator 40 including magnetic yokes 41 and 44 and having alternating polarity permanent magnets 42 and 43 (S and N respectively) resting in a slot 45 in lower magnetic yoke 44. The series of magnets are aligned with magnetizations perpendicular to yoke 44 with alternating poles 42, 43, 42, 43, 42 . . . providing alternating north, south, north, south . . . south poles from left to right. Extending parallel to yoke 44 above the magnets 42 and 43 is the upper yoke 41 which contains the magnetic field within the stator 40. The armature 26 includes two actuator coils 24 and 25 with connector wires 64 and 62 adapted to fit within the elongated, slot-like space 55 within the stator 40 defined between lower yoke 44 plus the magnets 42 and 43, below, and the upper yoke 41, above. The coils 24 and 25 are spaced an appropriate distance apart so that one of the coils, when actuated by current in wires 64 and 62 respectively, will provide a linear force along the length of the armature 26 on an axis indicated by the double headed arrow in a direction determined by the direction of the current in the coil and the direction of the magnetic field produced by magnets 42 and 43 at the coil energized. The two coils 24 and 25 are alternately energized as the armature 26 moves along the array of magnets 42 and 43 providing a set of actuation forces in a single direction until the servo system stops the armature 26 where it is commanded by the servo control system. The double set of coils 24 and 25 makes it possible to provide a very long stroke plus precision accuracy in positioning over a large range of positions. FIG. 5 shows the coil 24 with current I located with its center aligned over the center of a magnet 42, while coil 25 is centered on the edges 70 of two magnets 42 and 43. In this position, current through coil 24 will cause no net force, whereas current through coil 25 (depending upon its direction) will cause motion tending to center it over one of the two magnets 42 and 43. Another means of illustrating this is shown in FIG. 6.1. If a constant DC current, e.g. one ampere, is passed through coil 24, and the carriage 26 is moved through different positions, an electromagnetic force of varying amplitude and polarity will be experienced. The position at which the force is zero corresponds to the physical situation in FIG. 5, where the legs of coil 24 are straddling a magnet boundary to produce no net force. If the carriage 46 contained only coil 24, this would lead to unusable regions where the actuator 26 is ineffectual. However, coil 25 is located within the carriage with a different relationship to the magnets, as in FIG. 5, and has a force curve, the dashed line in FIG. 6.2, which is maximum just where the curve of coil 24 has a null.

A conventional magnetic actuator has a force versus position curve for constant current which ideally would be completely uniform, as in FIG. 6.4. It is a goal of this invention to make the low mass, long stroke actuator present such behavior to the control system (in order to utilize the body of knowledge existing for such system, e.g. the referenced techniques of Oswald and others) by utilizing specialized electronics. One of the functions of this electronics is understood from FIG. 6.3. This shows a force versus position curve for the actuator when the current is switched into coil 24 over the region of its maximum force and efficiency, then into coil 25 for the next region, then into coil 24 *with the polarity reversed* for the next region, then into coil 25 with polarity reversed, then into coil 24 with normal polarity, and so on, over as long a stroke as might be required. The resulting minor variation of force with position are removed by modulating current, or gain of the current amplifier, with position as shown in FIG. 6.5.

More specifically, in FIG. 6.1, the coil 24 has a force versus position curve which is a sine wave or rounded trapezoidal wave, with the force reaching a minimum at each point of transition of the magnets. FIG. 6.3 shows how the combination of the two coils 24 and 25 generate a composite of force and position values similar to a rectification curve. In general, the force position curve appears to be flat as shown in FIG. 6.4, because the product of the curve force constant in FIG. 6.3 and the gain in curve in 6.5 is constant. One way of obtaining the required polarity reversals is to utilize negative gain constants for the appropriate regions.

Figure 1:
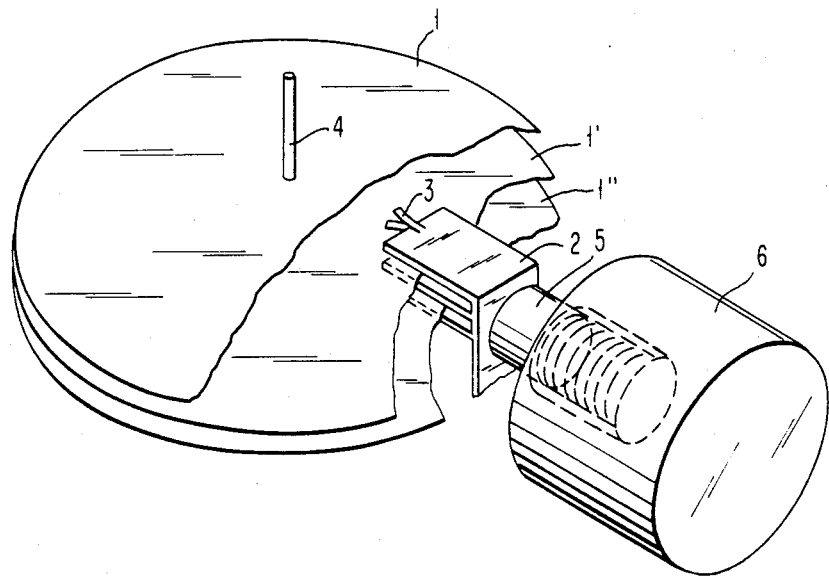
FIG. 1 shows a perspective schematic view of a conventional voice coil actuator for magnetic recording disks.
Figure 2:
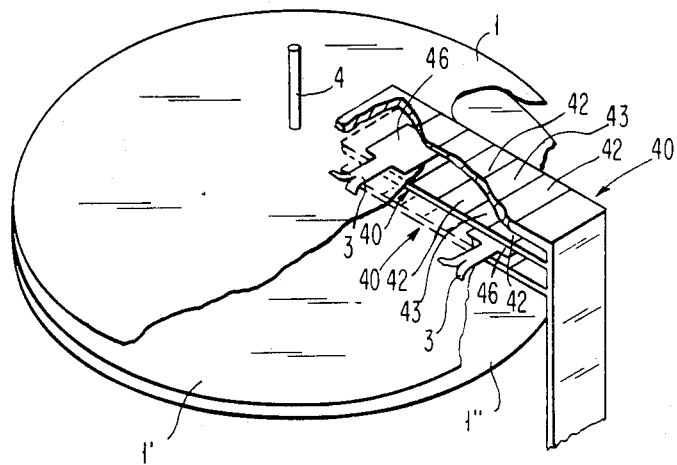
FIG. 2 shows a similar schematic view of a novel actuator in accordance with this invention.
Figure 3:
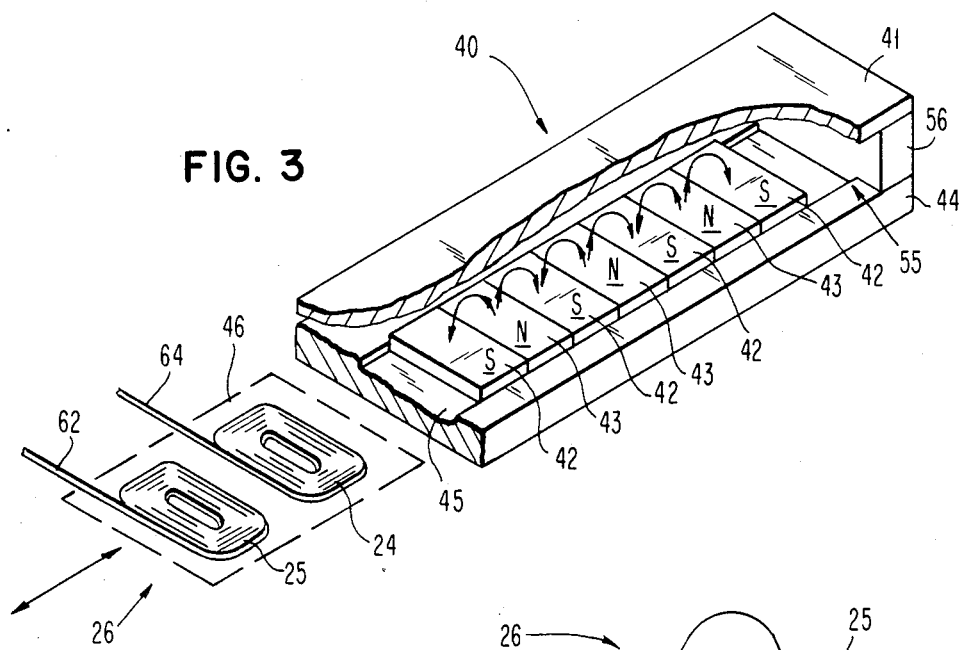
FIG. 3 shows a perspective view of the stator of the actuator of this invention inverted with respect to FIG. 2 with a portion of the upper shield cut away for convenience of illustration and a portion of the armature shown in juxtaposition with the stator, but moved to the left of its usual location above the magnets of the stator.
Figure 4:
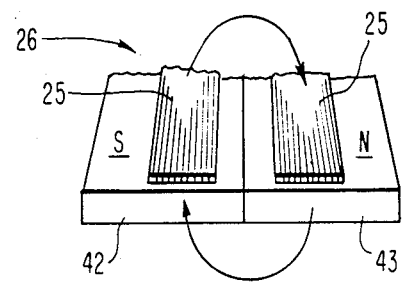
FIG. 4 shows a perspective view of a fragment of the magnet structure of the magnet array of FIG. 3 from a different point of view, with fragments of one of the coils illustrated.
Figure 5:
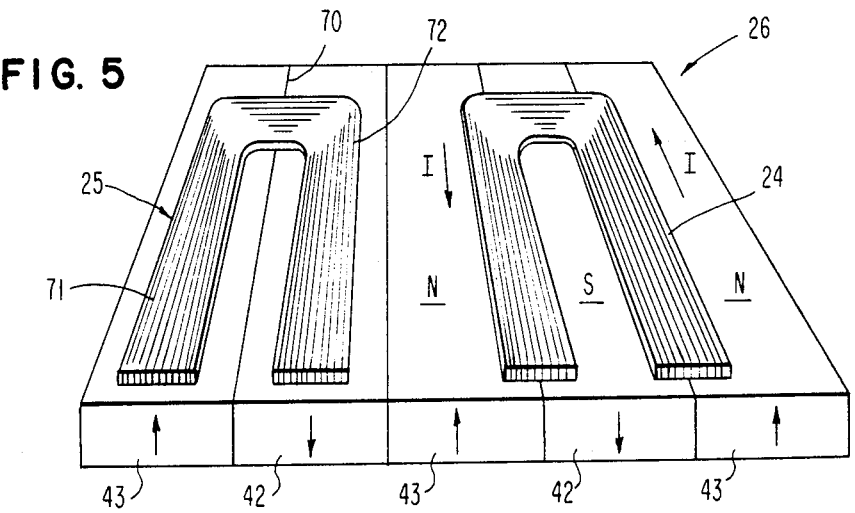
FIG. 5 is a similar view to that of FIG. 4 with larger fragments of the coil and another coil and a number of additional magnets illustrated to show the alignment of the edges of the magnets with the spacing of the coils which assures that there will be sufficient offset to drive the armature at all positions without a "dead spot" with no net force from the two actuators.
Figure 7:
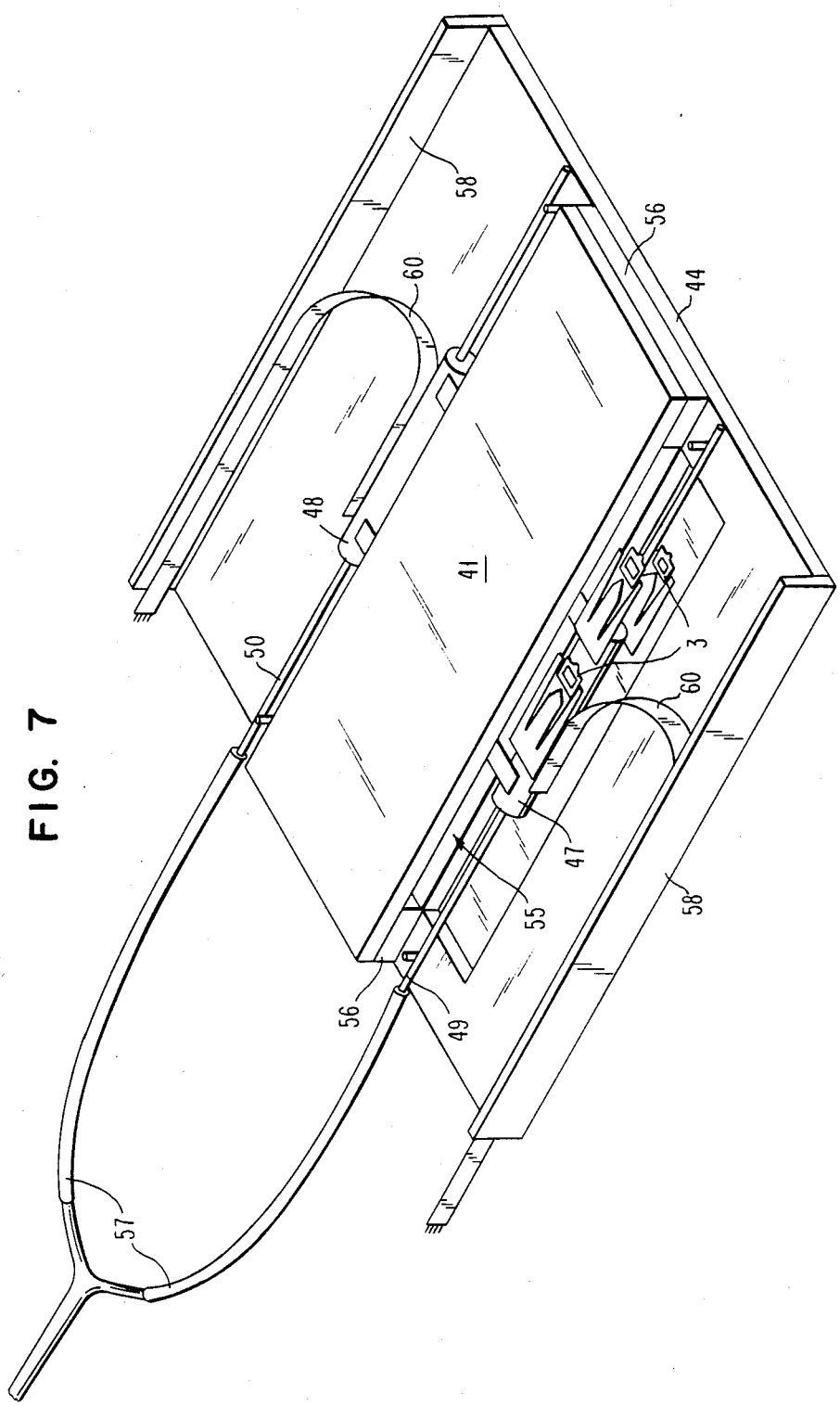
FIG. 7 is a perspective view of the overall actuator of FIG. 2 shown in greater detail.
Figure 8:
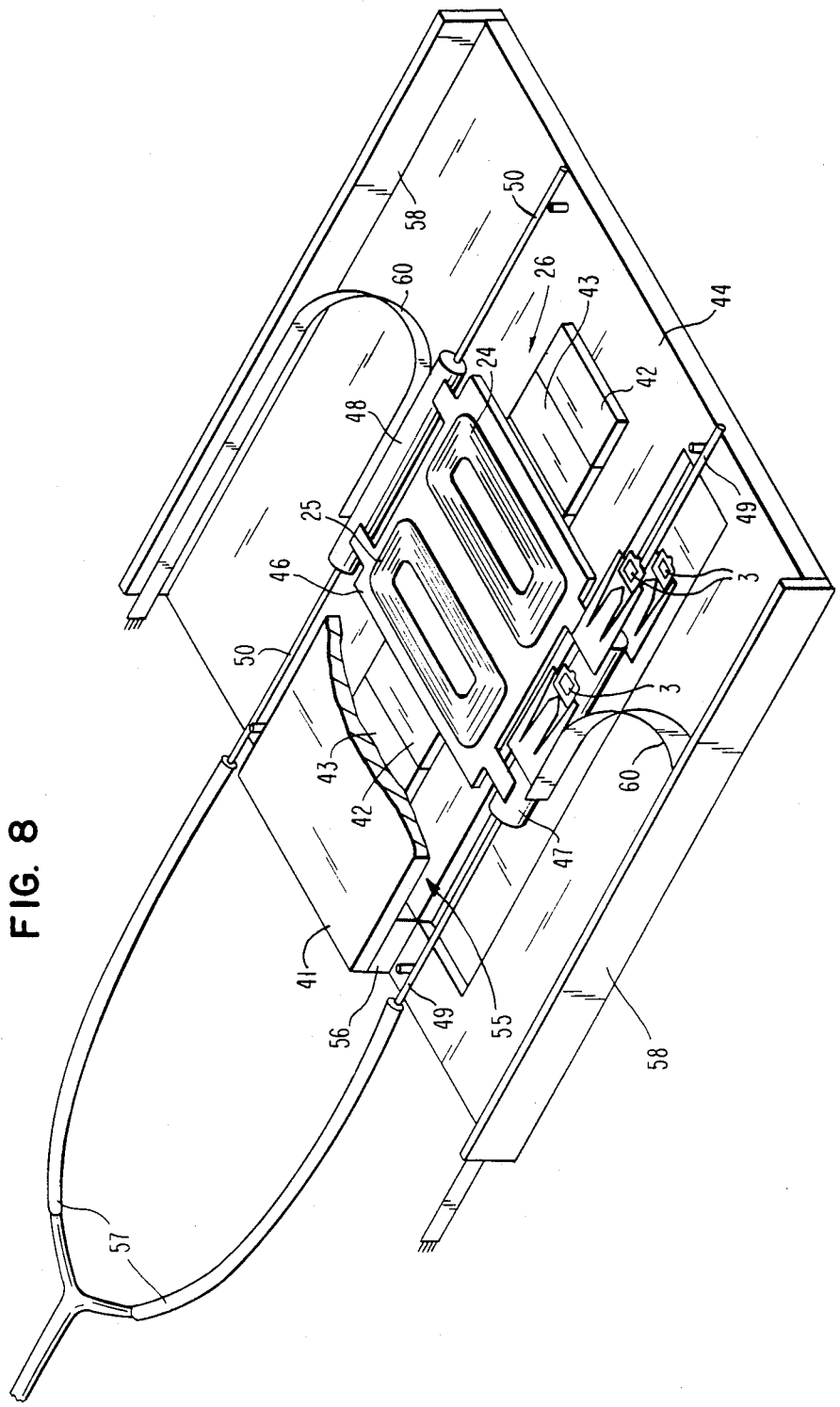
FIG. 8 shows the actuator of FIG. 7 with a large portion of the upper magnetic shield (yoke) removed for convenience of illustration to show the mechanical relationship between parts of the stator and the armature.

FIG. 7 shows the actuator with the lower magnetic yoke 44 supporting the magnetic yoke end pieces 56, which in turn support and carry the upper magnetic yoke 41. The yokes 41 and 44 and end pieces 56 define a space 55 for the armature 26, which shuttles back and forth within space 55. The bearing tubes 49 and 50 are hollow pneumatic tubes supplied with air from lines 57 which is used to support hollow, cylindrical pneumatic bearings 47 and 48. The armature carries the magnetic recording heads 3 linearly parallel to the tubes 49 and 50. The armature 26 is powered and signals are picked up by the heads 3 from the magnetic recording disks via harness 60. Wiring harnesses 60 each consists of a flexible strip of parallel wires carried by the armature 26 and supported at the broadly extending sides of the lower yoke 44 by side plates 58. In FIG. 8, the armature 26 and magnets 42 and 43 of the stator can be seen because the upper yoke 41 has been partially cut away to show the structure below. Here it can be seen how the elements of the structure all fit together to provide the linear actuator for the heads 3.

FIG. 9 shows the electronic system for control of the actuator.

The essential function of the head drive control system is to operate a multiple coil linear drive motor to locate sets of magnetic recording heads 3 over a specific track on a multi-track magnetic recording disk 1, 1' or 1" during each seek operation. Once the track sought has been located by the head (with the head over that track) the system must help the servo mechanism to follow that track during rotation of the disk. Following the track involves moving the head back and forth with the track as it deviates from a fixed position relative to the head.

Disk controller 10 produces track request signals on line 11 which connects to an input of the servo electronics circuit 12. The servo electronics circuit 12 also is connected to receive inputs on line 16 from the servo head 17 which is juxtaposed with the disk and reads the track number and provides the position signal (providing centering information). It will be recognized by those skilled in the art that while the functions of the servo head sensing means 17 and the magnetic recording head 3 have been discussed individually, the magnetic recording head 3 can perform both functions. The servo electronics combine the track request signal on line 11 and the track servo signal on line 16 to yield a position error signal on line 15 which varies as a function of the number of track positions or fractional positions of the error. The track number signal on line 14 reflects the track nearest to the actual position of the head as indicated by the signal on line 16 which is used in the seek operation. For a number from line 14, provided to the left column of the lookup table electronics 35, there is a coil number for operating one of the coil drivers 22 or 23 "0" or "1". Also, there is a gain number, which is supplied by electronics 35 via line 32 to the multiplying digital-to-analog controller (DAC) 30 which uses the position error signal on line 15 produced by the servo electronics which calculates the position error (defined as: the difference between the track request (desired track position) on line 11, and the actual track position as indicated by a signal on line 16) to provide an indication of how well the read head is centered on the track over which it is located. The analog input on line 15 to DAC 30 is amplified by the magnitude of the digital gain signal on line 32 and converted into an analog output signal on line 20 which operates driver 22 or 23, as selected by lines 18 and 19, to drive the servo coils 24 and 25 of the armature.

In conclusion, the combination of the two coils, (operating with the array of permanent magnets using the signals provided by the lookup table 35 and the DAC 30) results in a one-for-one correspondence between each track position, the current polarity, gain, and selected actuator coil 24 or 25 carried on the carriage 46 of the armature 26.

Naturally, the system may also be used with optical commutating and gain-variation means, by which a partially transparent pattern may be sensed by a photocell device to determine what coil is connected (and with what gain) to the driving source.

Having thus described our invention, what we claim as new and desire to secure by Letters Patent is:

1. In an actuator for use with a magnetic recording disk file including at least one magnetic recording head and at least a pair of stacked magnetic recording disks, said actuator being characterized by:

a motor sufficiently narrow to be positionable between two adjacent stacked disks in a disk file and extending radially across at least one of said pair of disks, said motor including a stator with a magnetic yoke having a plurality of magnets alternating polarity arranged in an array, side-by-side on one arm of said yoke, and an armature adapted to be propelled along said array of magnets, said armature including a pair of flat magnetic coils arranged in side-by-side relationship for bridging from one of said magnets to another of said magnets along said stator, said armature coacting with said stator and supporting said coupled to said magnetic head;

a head position sensor means whereby said magnetic head reads said track information on a said disk and provides a position signal output in response to said track information and an automatic control means, for controlling track position of said magnetic recording head over a specific track on a disk of said disk file, said automatic control means being adapted to control the energization of said coils sequentially and alternately as a result of said position signal output of said sensor means, which sensor means provides position information to said automatic control means.

2. In a magnetic recording disk file system including a spindle and at least a pair of magnetic recording disks, said recording disks being in a stacked arrangement for rotation about said spindle, said system including an actuator and at least a magnetic recording head, said actuator having a stator radially sufficiently narrow to be positionable between two adjacent stacked disks in a disk file and including a magnetic yoke with multiple pairs of magnets arranged side-by-side of alternating magnetic polarity on one arm of said yoke, an armature including a pair of flat magnetic coils arranged in a side by side relationship for briding from one of said magnets to another of said magnets along said stator said armature coacting with said stator and supporting and coupled to said magnetic head, and an automatic control means being adapted to control the energization of said coils sequentially and alternatively.

3. A system in accordance with claim 2 wherein said system further includes: a servo control system, including means for providing feedback of stored control signals as a function of head position, such that said disks include track information thereon, whereby head position sensor means on said head provide track signal output in response to said track information on a said disk position;

means for inputting said track position signal output from said head position sensor means and, means for determining the difference between actual position of said head and a position command applied to said system, means for outputs connected to said coils for operating said coils in sequence as a function of said signal output which is indicative of the position of said head.

* * * * *